United States Patent

Blackwell et al.

[11] Patent Number: 5,876,811
[45] Date of Patent: Mar. 2, 1999

[54] MICROWAVABLE SINGLE-SERVING MEAL CONTAINER

[76] Inventors: Tommie R. Blackwell, 726 Creek Rd., Montevallo, Ala. 35115; Matthew Wallo, 6218 Colbert St., New Orleans, La. 70124

[21] Appl. No.: 869,866

[22] Filed: Mar. 18, 1992

Related U.S. Application Data

[63] Continuation of Ser. No. 618,460, Nov. 27, 1990, abandoned.

[51] Int. Cl.$^6$ ..................................................... F24H 7/00
[52] U.S. Cl. ........................ 428/34.1; 220/405; 220/412; 220/500; 220/902; 220/DIG. 10
[58] Field of Search .................. 428/34.1, 36.1, 428/36.5, 71, 76, 160, 34.9, 213, 218, 220, 313.3, 53, 339, 340, 347, 423.1; 426/107, 113; 108/42; 220/903, 440, 405, 412, 500, 648, 649, 675, 902, DIG. 9–12; 219/10.55 E

[56] References Cited

U.S. PATENT DOCUMENTS

| | | | |
|---|---|---|---|
| 3,799,386 | 3/1974 | Madalin et al. | 220/412 |
| 3,845,875 | 11/1974 | Douglas et al. | 220/902 |
| 3,966,972 | 6/1976 | Theimer et al. | 426/90 |
| 4,190,155 | 2/1980 | Higley | 206/445 |
| 4,258,695 | 3/1981 | McCarton et al. | 126/375 |
| 4,360,105 | 11/1982 | Williams | 206/544 |
| 4,851,632 | 7/1989 | Kaliski | 209/10.55 E |
| 4,871,597 | 10/1989 | Hobson | 428/36.1 |
| 4,872,577 | 10/1989 | Smith | 220/85 H |
| 4,923,704 | 5/1990 | Levinson | 426/243 |
| 4,924,048 | 5/1990 | Bunce et al. | 219/10.55 |
| 4,927,047 | 5/1990 | Stuber et al. | 220/90.2 |
| 4,948,604 | 8/1990 | Kuehne et al. | 426/107 |
| 4,973,502 | 11/1990 | Holåzmüller et al. | 428/35.8 |
| 4,992,636 | 2/1991 | Namiki et al. | 219/10.55 EE |

*Primary Examiner*—Charles Nold
*Attorney, Agent, or Firm*—Staas & Halsey

[57] ABSTRACT

A microwavable single-serving meal container comprising a microwavable meal tray containing a food product; and a microwavable polyurethane foam shell having a shape adapted to substantially conform to the shape of the meal tray, said foam shell enveloping the meal tray and thus the food product during microwaving of the food product to thereby retain microwave induced heat.

2 Claims, 2 Drawing Sheets

MICROWAVABLE SINGLE-SERVING MEAL CONTAINER

This application is a continuation, of application Ser. No. 07/618,460, filed Nov. 27, 1990, now abandoned.

BACKGROUND OF THE INVENTION

1. Field of the Invention

The present invention relates generally to the field of thermally insulated food containers and, more specifically, to a microwavable single-serving meal container capable of retaining heat at a desirable level for several hours after initial microwaving.

2. Description of the Related Art

The advent of microwave ovens has lead to a near revolution in the field of food preparation. It is now common practice to package a single-serving meal in a microwavable container (non-metallic) so that a hot meal can be prepared in a matter of one to four minutes.

With conventional containers for single-serving meals, it is necessary for the consumer to have convenient access to a microwave oven, since after microwaving, the food typically cools to room temperature a short time after microwaving.

In some situations, a microwave oven is neither conveniently available nor practically useable, such as in the case of young school children. Typically, schools do not provide microwave ovens for use by students, and even if they were available, some school children are too young to operate the microwave ovens.

Generally, child nutrition is a widespread concern. The incidence of childhood obesity and high cholesterol levels is becoming a national problem that is exacerbated by the large number of working parents who do not have time to give proper consideration to family nutrition. While it is desirable to provide single-serving meals for children in school, there exists a problem in that heretofore there has been no practical and feasible way to provide heating of these meals. Thus, a health problem is created whereby parent are encouraged to provide junk food or high-fat/starch foods in the absence of having a practical way to provide nutritious meals.

SUMMARY OF THE INVENTION

An object of the present invention is to provide a microwavable single-serving meal container capable of retaining a temperature of about 110°–140° for about four to five hours. Another object of the present invention is to provide a microwavable single-serving meal container which is compact so as to fit in one side of a child's lunch box.

Another object of the present invention is to provide a microwavable single-serving meal container in which a thermal insulating shell is used to retain microwave-generated heat, with the shell being made of inexpensive, non-toxic, disposable materials.

These and other objects of the invention are met by providing a microwavable single-serving meal container which includes a microwavable meal tray containing a food product, and a microwavable polyurethane foam shell having a shape adapted to substantially conform to the shape of a meal tray, said foam shell enveloping the meal tray and thus the food product during microwaving of the food product to thereby retain microwave induced heat.

Preferably, the polyurethane foam has a density of about 1.5 to 4 pounds per cubic foot (PCF) and may be self-skinning. Also, the foam shell preferably has a wall thickness of about 0.5 inch.

These and other features and advantages of the microwavable single-serving meal will become more apparent with reference to the following detailed description and drawings.

DETAILED DESCRIPTION OF THE PREFERRED EMBODIMENTS

Figure 1:
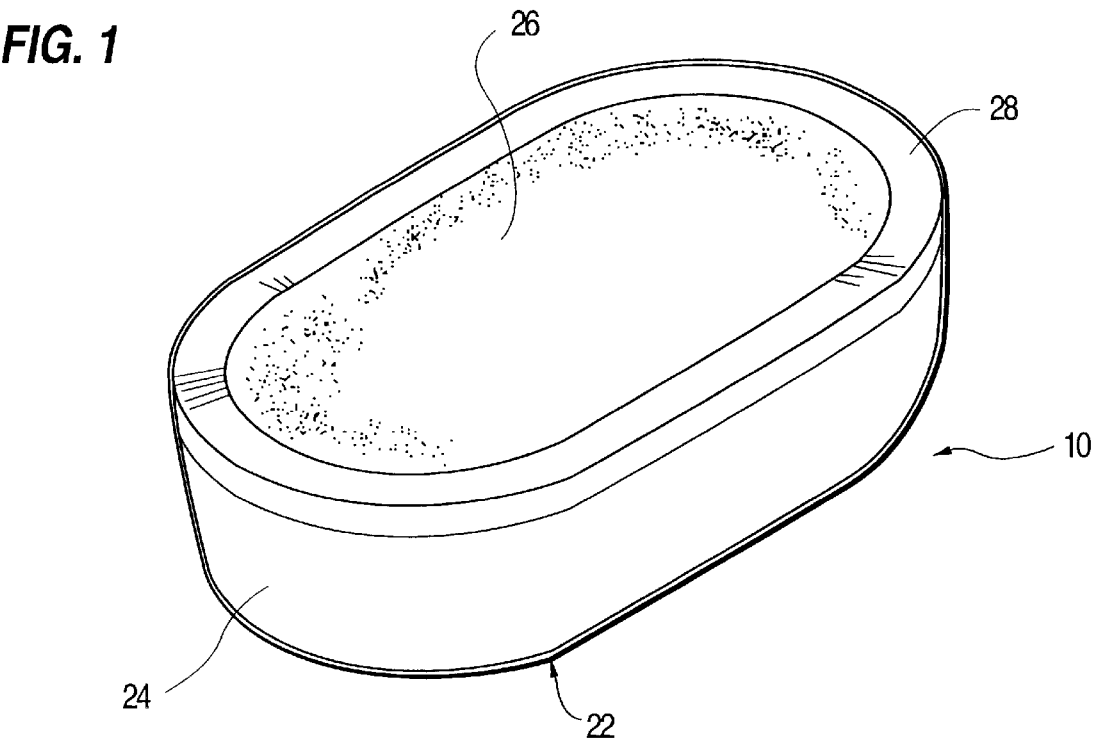
FIG. 1 is a perspective view of a first preferred embodiment of the present invention.
Figure 2:
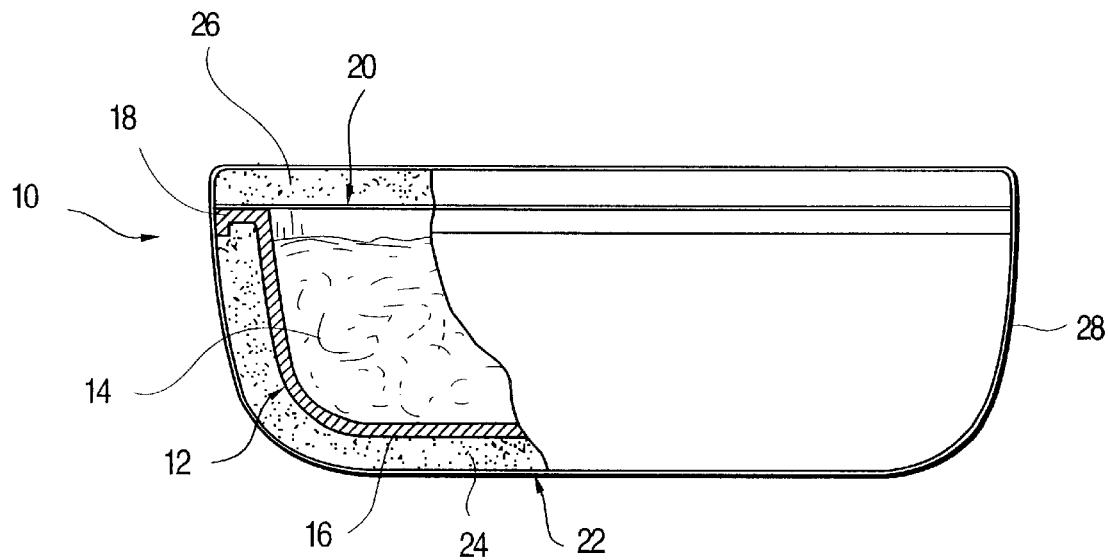
FIG. 2 is a longitudinal vertical sectional view of the embodiment of FIG. 1.
Figure 3:
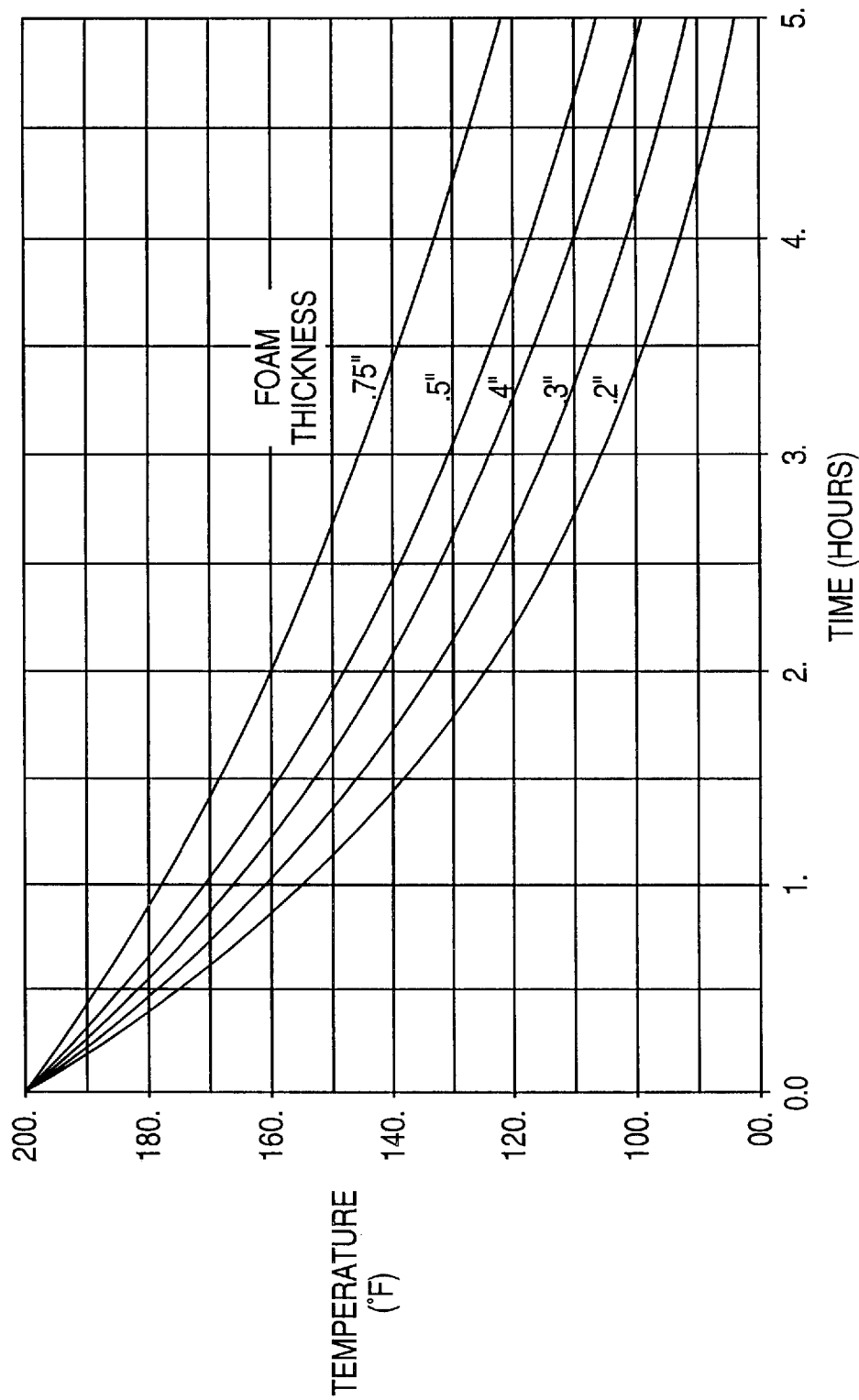
FIG. 3 is a graph showing thermal characteristics of the polyurethane foam materials used in the present invention.

Referring to FIGS. 1–3, a microwavable single-serving meal is generally referred to by the numeral 10 and includes a microwavable meal tray 12 which contains a food product 14. The meal tray 12 includes a lower body portion 16 and an integrally formed upper flange 18 which extends radially outwardly from an upper edge of the body portion 16 so as to define a flat surface on which a plastic lid 20 can be vacuum sealed. Since the body 16 and flange 18 are integrally molded of microwavable plastic material, the plastic lid can be thermally bonded to the flange, and peeled off when the meal package 10 is ready to eat.

The meal tray 12 is encased or enveloped in a microwavable polyurethane foam shell 22 having a lower body 24 and a top 26. The shell 22 has a shape which substantially conforms to the shape of the meal tray 12. The shape of both the meal tray and the shell can be of any suitable configuration for containing a single-serving meal, and can be, for example, a round bowl or an oval, as illustrated in FIGS. 1 and 2. The overall shape could also be rectangular, or of virtually any other shape which can be molded to fit the shape or size of the meal tray 12. The only practical limitation on shape is that the container should fit into a lunch-box.

The foam material is polyurethane having a density of 1.5 to 4 pounds per cubic foot and is preferably molded using standard manual or automatic reaction injection molding (RIM) foam molding techniques. In the illustrated embodiment, the top 26 is held to the body 24 by shrink wrapping with plastic material 28. Shrink wrapping using standard techniques and commercially available materials is but one way of holding the top 26 to the body 24. It is also possible to provide a hinge (not shown), whereby the body 24 and top 26 are molded as one piece and joined together at a hinge. A fastener can be provided opposite the hinge to maintain the position of the top.

One feature of the present invention is that most food products held within the meal tray 12 need not be vented during microwaving so that once packaged, the entire meal 10 is microwaved with the lid 20 and top 26 completely un-perforated. However, some types of meals may require venting, and this could be achieved by including vent tube (not shown) which presses through the shell and tray. The vent tube can be sealed during storage, opened during microwaving and re-sealed (for example by crimping) after microwaving to avoid heat loss.

An example of the present invention, as illustrated in FIGS. 1 and 2, has a meal tray 12 which is approximately 6½ inches by 4½ inches by 1¾ inches. The foam body 24 and top 26 are sized to conform to the outer dimensions of the meal tray 12. An important aspect of the present invention is to maintain a temperature of about 110°–140° over an extended period of time, for example, up to five hours. This corresponds approximately to the time from which a meal is microwaved (at the home) to the time that the meal is eaten (at the school or office). To accomplish this feature, after it was determined that polyurethane foam was best suited for microwaving, tests were performed to determine the proper thickness of the foam. FIG. 3 represents a graph of food temperature versus time, whereby it was determined that foam thickness of ½ inch was preferred.

A number of commercially available polyurethane foam materials can be used according to the present invention. Polyurethane foam was determined to be preferred for the present invention due to its resistance to thermal conductivity. The commercially available polyurethanes for RIM molding techniques are preferably of the type involving two components A and B. The A component contains an isocyanate and the B component contains a catalyst, polyol, freon, water or other blocking agents and a surfactant. When the A and B components are mixed, a reaction results in the formation of a closed cell rigid foam which can be self-skinning to have a smooth outer appearance. Basically, the freon or catalyst amounts in the mixture can be varied to produce the self-skinning quality.

FIG. 3 is based on a thermal analysis using a thermal math model develops to analyze the proposed foam insulation. A model food container was used, having dimensions of five inches by three inches by two inches, and this container was covered with various thicknesses of foam material. The foam insulation is commercially available under the designation BX 250. The weight of the food container plus food in the experiment was ten ounces, and a specific heat equal to that of water, 1 BTU/Lb-Degree F., was used in the analysis. Room temperature was assumed to be 68° F. and a heat transfer coefficient external to the shell of 1 BTU/ft$^2$-hr-Degree F. was used. The initial temperature of the food was 200° F. FIG. 3 thus shows a plot of the resulting food temperature versus time for the range of foam thicknesses tested. To ensure that food did not cool to less than 120° at the end of five hours, a foam thickness of 0.75 inches would be required. However, in most instances, if a temperature of 110° to 120° F. is all that is required, a 0.5 inch foam can be used effectively.

It has been determined that polyurethane foam, in a cured condition, is not chemically toxic and is therefore suitable for the intended use of the present invention. Also, while it was generally noted above the venting is not required, a separate vent tube could be provided so as to be openable during microwaving and closeable thereafter so as not to provide an escape path for heat. In commercial applications, it may also be desirable to color the foam, and for that purpose, there are several commercially available pigments (such as Ferro V-3285 and Ferro V-9412). These pigments are suitable when added in an amount of 5 to 10% by weight of the foam materials.

According to the present invention as described herein, a foam shell was molded by RIM molding techniques to form a clamp shell type structure which is held together by shrink wrap. It is also possible to provide the foam directly on the meal packages by "cocooning", whereby the foam material is applied directly to the meal package. In this case, shrink wrap would not be required to hold separate parts of the shell together since a single unibody structure would be created.

Polyurethane foam materials are commercially available, such as PDL-4034, which is a 2.5 PCF density polyurethane pour foam. Shrink wrapping material is also commercially available, such as Reynolon 2016.

One of the more salient features of the present invention is the fact that the food contained within the meal tray 12 and enveloped in the shell 22 can be microwaved in the morning and eaten in the afternoon at a temperature compatible with that of a "hot" meal. Thus, lunch time meals can be consumed as if they were recently microwaved when in fact they may have been microwaved four or five hours earlier. This obviates the need for having a microwave oven on the premises at the time of consumption of the food, thus making the present invention particularly well suited for a child's lunch.

From the above, it should be readily understood that according to the present invention a food product is packaged in the meal tray and vacuum sealed therein by means of the lid 20. The food and meal tray are then enveloped in a polyurethane foam shell which includes a lower body 24 and the top 26. Then, the body and top are held together by shrink wrap material and thus the assembled single-serving meal container can be stored on a shelf (if packaged for nonrefrigeration) or if refrigeration is required, the container can be stored in a refrigerated environment. Then, when the meal is to be used for lunch, such that the user (such as a child) would not have access to a microwave oven, the container would be placed in a microwave for a time sufficient to heat the food contained therein to a temperature of about 200° F. Since microwaving involves heating from the inside out, and since the polyurethane foam shell is dry, the shell will not be hot so that it can be handled easily, while at the same time the food contained therein will be at a high temperature suitable for consumption. Although some loss of heat is to be expected, the thickness of the foam is selected so that the meal can be consumed four or five hours later at a temperature suitable for a "hot" meal, such as 110°–120° F.

Throughout this disclosure the word "meal" has been used to refer to a food product. While the preferred embodiment is for a microwavable single-serving meal (i.e., breakfast, lunch, or dinner), the food product could also be a snack food or a beverage.

Numerous modifications and adaptations of the present invention will be apparent to those so skilled in the art and thus, it is intended by the following claims to cover all such modifications and adaptations which fall within the true spirit and scope of the invention.

What is claimed is:

1. A microwavable single-serving meal container, comprising:
    a microwavable meal tray containing a food product; and
    a microwavable polyurethane foam shell having a shape adapted to substantially conform to the shape of the meal tray, said foam shell enveloping the meal tray and thus the food product, and said foam shell having a wall thickness and a density sufficient to retain the temperature of said food product at above about 110° F. for at least about four hours when said food product is heated to about 200° F. wherein the meal tray has a lower body and an upper flange, and a lid bonded to the upper flange to provide a vacuum seal of the food product contained in the lower body.

2. A microwavable single-serving meal container as claimed in claim 1, wherein the polyurethane foam shell has a body having a shape substantially conforming to the shape of the lower body of the meal tray and being substantially flush with the flange of the meal tray, and a top fitted over the lid of the meal tray and being held thereto by shrink wrap material extending around the top and the body of the polyurethane foam shell.

\* \* \* \* \*